(12) United States Patent
Tonchia (10) Patent No.: US 8,851,005 B2
(45) Date of Patent: Oct. 7, 2014

(54) CLAMP-ON FAIRING AND METHOD

(75) Inventor: Hélène Tonchia, Antony (FR)

(73) Assignee: CGGVeritas Services SA, Massy Cedex (FR)

( * ) Notice: Subject to any disclaimer, the term of this patent is extended or adjusted under 35 U.S.C. 154(b) by 162 days.

(21) Appl. No.: 13/547,449

(22) Filed: Jul. 12, 2012

(65) Prior Publication Data

US 2013/0014685 A1   Jan. 17, 2013

Related U.S. Application Data (60) Provisional application No. 61/507,779, filed on Jul. 14, 2011.

(51) Int. Cl.
*F15D 1/00* (2006.01)
*G01V 1/38* (2006.01)

(52) U.S. Cl.
CPC .................................. *G01V 1/38* (2013.01)
USPC .............................................................. 114/243

(58) Field of Classification Search
USPC .................................... 114/242, 243, 253
See application file for complete search history.

(56) References Cited

U.S. PATENT DOCUMENTS

| | | | | |
|---|---|---|---|---|
| 3,209,718 A * | 10/1965 | Rather et al. | | 114/243 |
| 3,461,830 A * | 8/1969 | Wise et al. | | 114/243 |
| 4,171,674 A * | 10/1979 | Hale | | 114/243 |
| 4,365,574 A * | 12/1982 | Norminton | | 114/243 |
| 4,474,129 A * | 10/1984 | Watkins et al. | | 114/243 |
| 4,567,841 A * | 2/1986 | Hale | | 114/221 R |
| 4,700,651 A * | 10/1987 | Hale | | 114/243 |
| 4,829,929 A * | 5/1989 | Kerfoot | | 114/243 |
| 5,050,445 A * | 9/1991 | Duffy | | 74/502.5 |
| 5,335,620 A * | 8/1994 | Small | | 114/243 |
| 6,179,524 B1 * | 1/2001 | Allen et al. | | 405/211 |
| 6,401,646 B1 * | 6/2002 | Masters et al. | | 114/243 |
| 6,758,157 B2 * | 7/2004 | Grieger et al. | | 114/244 |
| 7,513,209 B2 * | 4/2009 | Masters et al. | | 114/243 |
| 7,674,074 B2 * | 3/2010 | Masters et al. | | 405/216 |
| 7,968,208 B2 * | 6/2011 | Hodgson | | 428/593 |
| 2013/0014685 A1 * | 1/2013 | Tonchia | | 114/243 |

FOREIGN PATENT DOCUMENTS

GB    2402266 A    12/2004

OTHER PUBLICATIONS

GB Search Report in corresponding Great Britain Application No. GB1212295.8 dated Oct. 25, 2012.

* cited by examiner

*Primary Examiner* — Lars A Olson
*Assistant Examiner* — Jovon Hayes
(74) *Attorney, Agent, or Firm* — Patent Portfolio Builders PLLC (57) ABSTRACT

Method and fairing to be attached to a cable of a seismic survey system for reducing drag and/or noise. The fairing includes a body having a hydrodynamic shape; a tail portion connected to the body; and a head portion connected to the body, opposite to the tail portion, and configured to be removably clamped-on to the cable. The head portion, the body and the tail portion extend in this order along a traveling direction.

19 Claims, 14 Drawing Sheets

CLAMP-ON FAIRING AND METHOD

RELATED APPLICATION

The present application is related to, and claims priority from U.S. Provisional Patent Application No. 61/507,779, filed Jul. 14, 2011, entitled "The Clamp on Fairing With Optical Cover" to Helene TONCHIA, the disclosure of which is incorporated herein by reference.

BACKGROUND

1. Technical Field

Embodiments of the subject matter disclosed herein generally relate to methods and systems and, more particularly, to mechanisms and techniques for reducing drag on a towed cable and/or reducing vibrations associated with the towed cable.

2. Discussion of the Background

During the past years, the interest in developing new oil and gas production fields has dramatically increased. However, the availability of land-based production fields is limited. Thus, the industry has now extended drilling to offshore locations, which appear to hold a vast amount of fossil fuel. Offshore drilling is an expensive process. Thus, those engaged in such a costly undertaking invest substantially in geophysical surveys in order to more accurately decide where to drill to avoid a dry well.

Marine seismic data acquisition and processing generate a profile (image) of the geophysical structure (subsurface) under the seafloor. While this profile does not provide an accurate location for the oil and gas, it suggests, to those trained in the field, the presence or absence of oil and/or gas. Thus, providing a high-resolution image of the subsurface is an ongoing process for the exploration of natural resources, including, among others, oil and/or gas.

Figure 1:
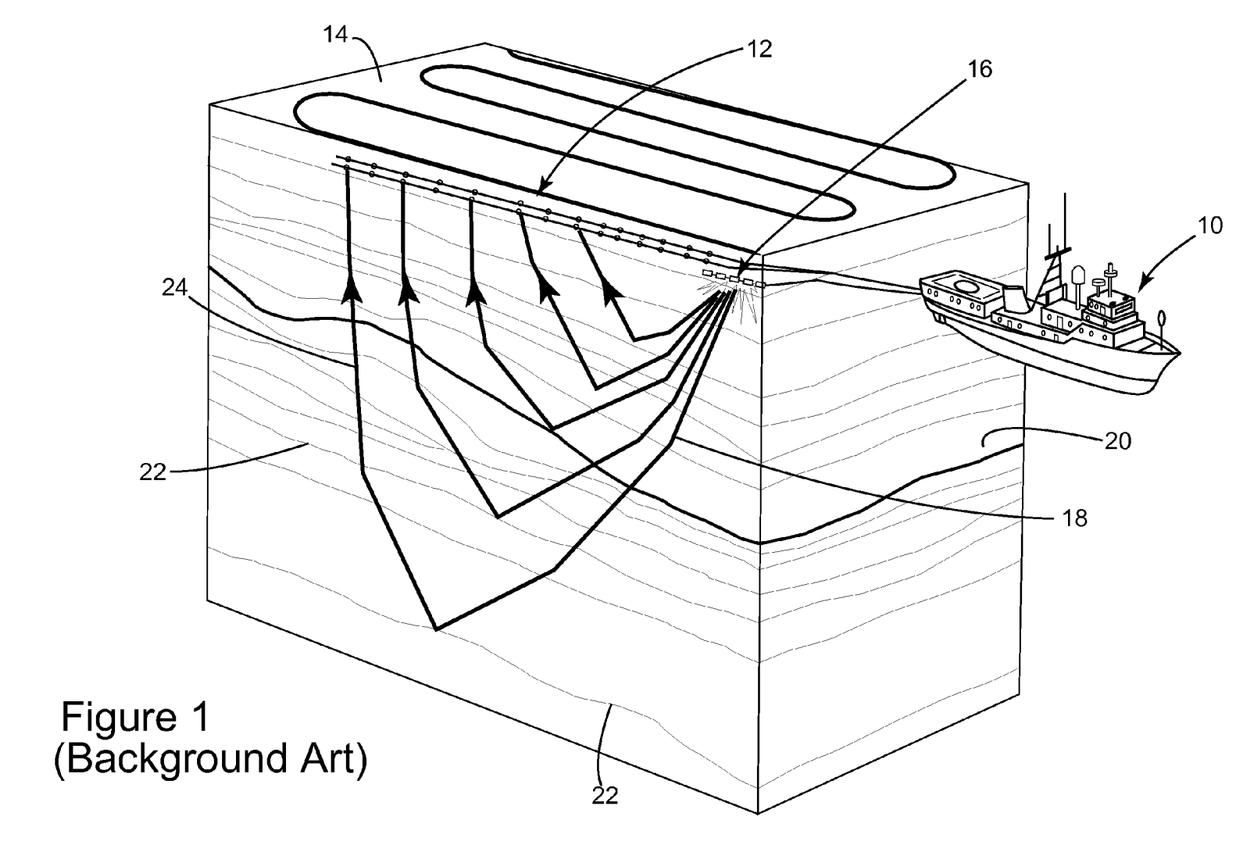
FIG. 1 is a schematic diagram of a conventional marine seismic acquisition configuration.

During a seismic gathering process, as shown in FIG. 1, a vessel 10 tows an array of seismic detectors provided on streamers 12. The streamers may be disposed horizontally, i.e., lying at a constant depth relative to a surface 14 of the ocean. The vessel 10 also tows a seismic source assembly 16 that is configured to generate an acoustic wave 18. The acoustic wave 18 propagates downward toward the seafloor 20 and penetrates the seafloor until eventually a reflecting structure 22 (reflector) reflects the acoustic wave. The reflected acoustic wave 24 propagates upward until it is detected by a detector 26.

Figure 2:
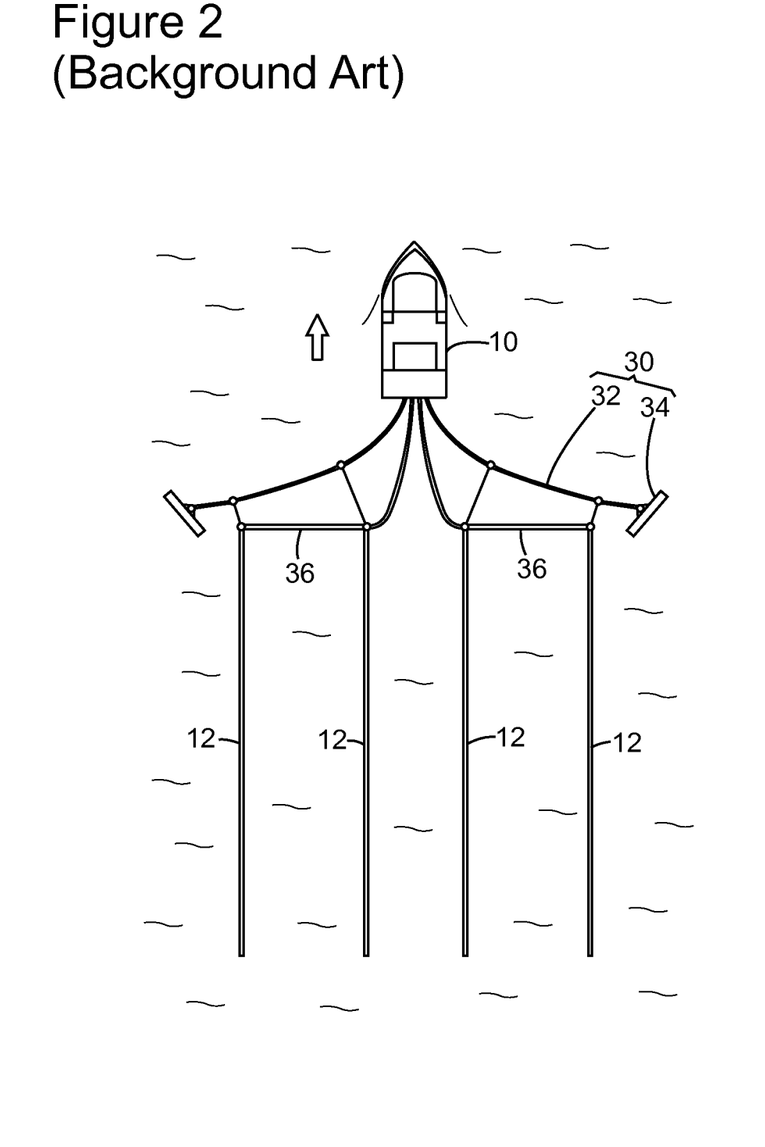
FIG. 2 is a schematic diagram of another conventional marine seismic acquisition configuration.

The streamers 12 are shown in FIG. 2 spreading over a predetermined area. This is called the seismic spread. In order to maintain the plural streamers 12 substantially parallel and at equal distance from each other, various front-end gears are used. Streamers 12 are spread out to a desired width to provide measurements of the geological conditions over an acquisition area.

An example of a front-end gear 30 is shown in FIG. 2. The front-end gear 30 is provided between the vessel 10 and the various streamers 12, and this gear is configured to achieve the desired positioning for the streamer heads. FIG. 2 shows the front-end gear 30 to include cables 32 connected between the vessel 10 and deflectors 34. A cable is used herein to mean a rope, a metallic cable, a synthetic cable, a wire, etc. Deflector 34 is a structure capable of generating the necessary lift when towed to keep the streamers deployed in the transverse direction with respect to the sailing line of the towing vessel 10. Spacers 36 are attached to the cables 32 for distributing the lift force among them in order to obtain a substantially linear profile for the position of the streamer heads. The spacers 36 may be cables, wires, etc. Other cables may be present in the seismic spread and/or in the sources but, for simplicity, these other cables are not shown here.

However, all these cables, including the cables 32 and the spacers 36, generate drag when towed underwater by the vessel 10. The drag generated by all these cables may be substantial. In addition, when a cable is towed underwater and extends substantially perpendicular to a traveling distance, the cable oscillates or vibrates. Thus, the cables use the engine power of the vessel 10 and also introduce noise (due to the vibrations) that is undesirable because the streamers 12 will record seismic data and the noise produced by the cables.

A solution to the above problems is to add fairings to the cables. Conventional fairings are permanently attached to the cables by the manufacturer. However, this solution has the limitation that fairings damaged during the operation cannot be easily replaced. In addition, the operator of the cable cannot move the fairings along the cable to accommodate various seismic survey geometries.

Figure 3:
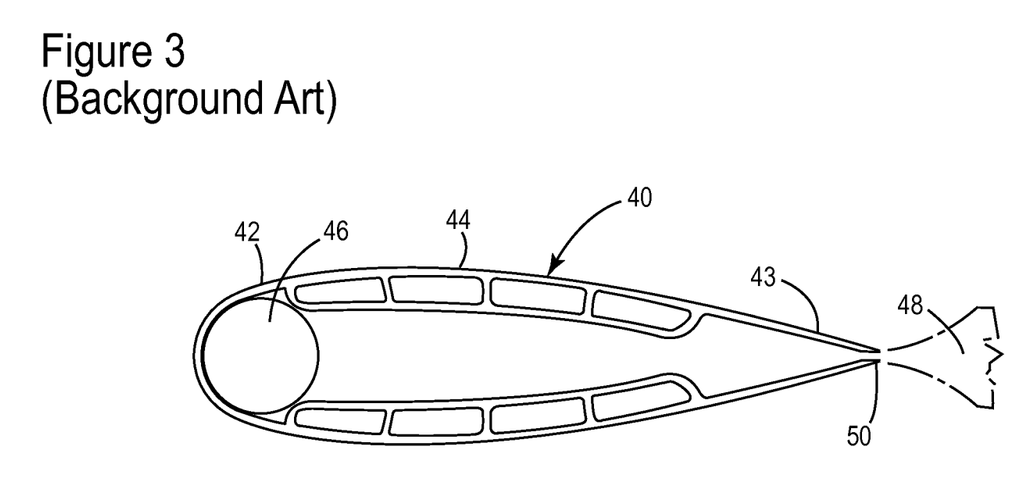
FIG. 3 is a schematic diagram of a conventional fairing.

U.S. Pat. No. 4,365,574 (herein the '574 patent) discloses, as shown in FIG. 3, which corresponds to FIG. 1 of the '574 patent, a fairing 40 that includes a nose 42, a tail section 43 and a pair of flanks 44. The fairing 40 can be attached to a cable 46 to reduce its drag. The way the fairing 40 is attached to the cable 46 is as follows. A spreader bar 48 is used to pry apart the tail 43. The spreader bar is thus inserted into a slit 50 of the tail section 43 and when the size of the slit 50 is large enough, the cable 46 is slid in or out of the fairing 40.

However, the process is cumbersome and labor-intensive because one person needs to hold the fairing 40 and another one has to pry open the slit 50 while either the first or the second person has to also handle the cable 46. Thus, there is a need to design a new fairing that can easily be attached or detached from a cable.

SUMMARY

According to an exemplary embodiment, there is a fairing to be attached to a cable of a seismic survey system. The fairing includes a body having a hydrodynamic shape; a tail portion connected to the body; and a head portion connected to the body, opposite to the tail portion, and configured to be removably clamped-on to the cable. The head portion, the body and the tail portion extend in this order along a traveling direction.

According to another exemplary embodiment, there is a fairing to be attached to a cable of a seismic survey system. The fairing includes a body having a hydrodynamic shape; and a head portion connected to the body and configured to be removable clamped-on to the cable. The head portion and the body are towed underwater during the seismic survey.

According to still another exemplary embodiment, there is a seismic survey system that includes a cable configured to be towed underwater; and a fairing configured to be attached to the cable. The fairing includes a body having a hydrodynamic shape, a tail portion connected to the body, and a head portion connected to the body, opposite to the tail portion, and configured to be removable clamped-on to the cable.

According to yet another exemplary embodiment, there is a method for attaching or removing a fairing from a cable. The method includes a step of clamping-on a head portion of the fairing to the cable, wherein the head portion is connected to a body that has a hydrodynamic shape; and a step of towing the cable and the fairing underwater while performing a seismic survey.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to a fairing to be attached to a cable of a front-end gear for towing plural streamers. However, the embodiments to be discussed next are not limited to a front-end gear, but may be applied to any cable that is towed underwater.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 4:
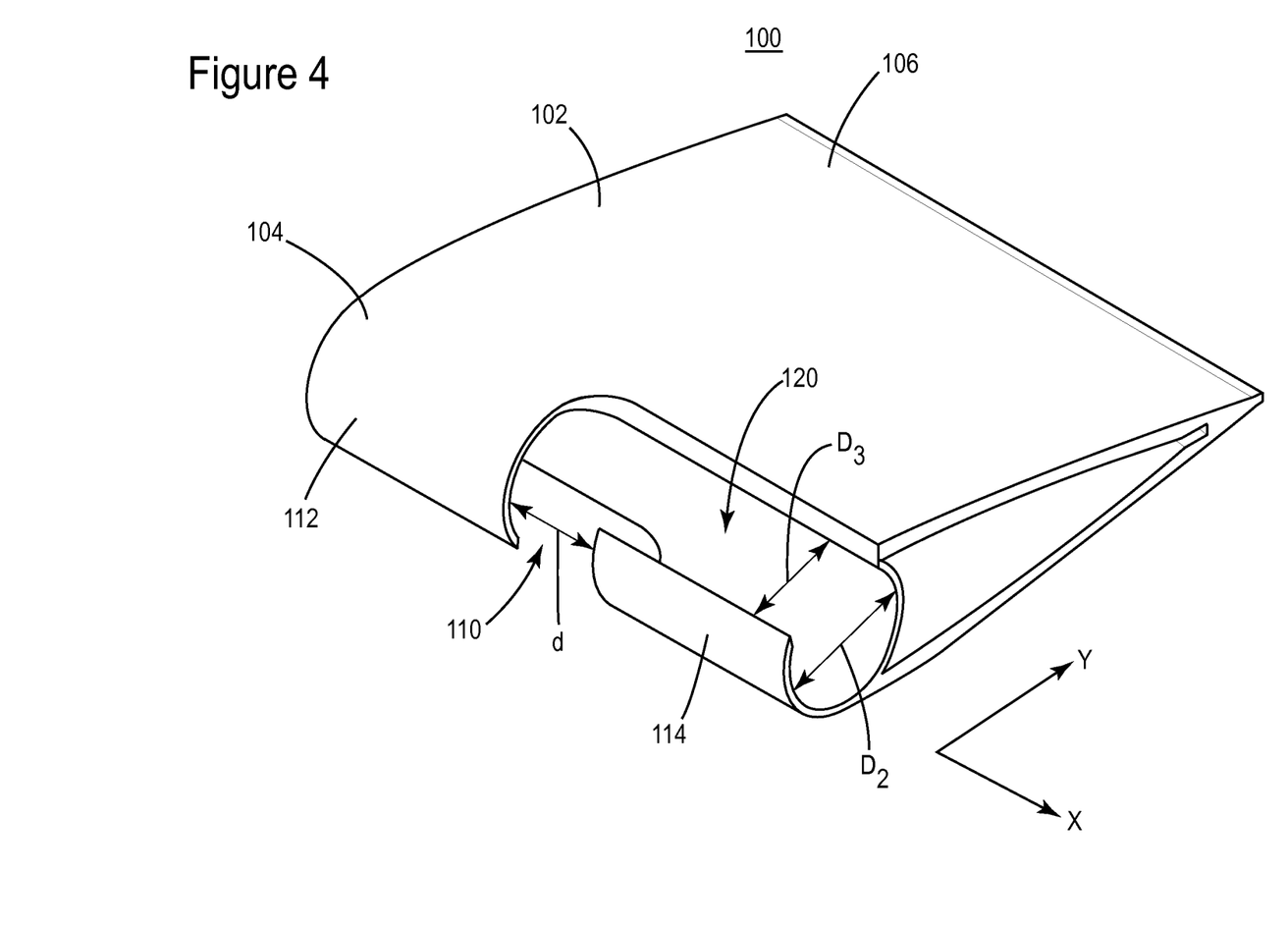
FIG. 4 is a schematic diagram of a snap-on fairing according to an exemplary embodiment.

According to an exemplary embodiment illustrated in FIG. 4, there is a fairing 100 that is configured to easily be attached or detached from a cable (not shown). The fairing 100 has a body 102 sandwiched between a head portion 104 and a tail portion 106. The body 102 may be configured to have a hydrodynamic shape. One or more of these parts may be made of a composite material, plastic, metal or a combination thereof. The material needs to be rigid enough not to bend when towed in the water but also flexible enough to allow the fairing to be attached to the cable, as discussed later. In one exemplary embodiment, the body, head portion and tail portion are made as a single piece. However, these parts may be made as separate components and then assembled, for example, by welding, gluing or using mechanical fasteners (e.g., screws).

Figure 5:
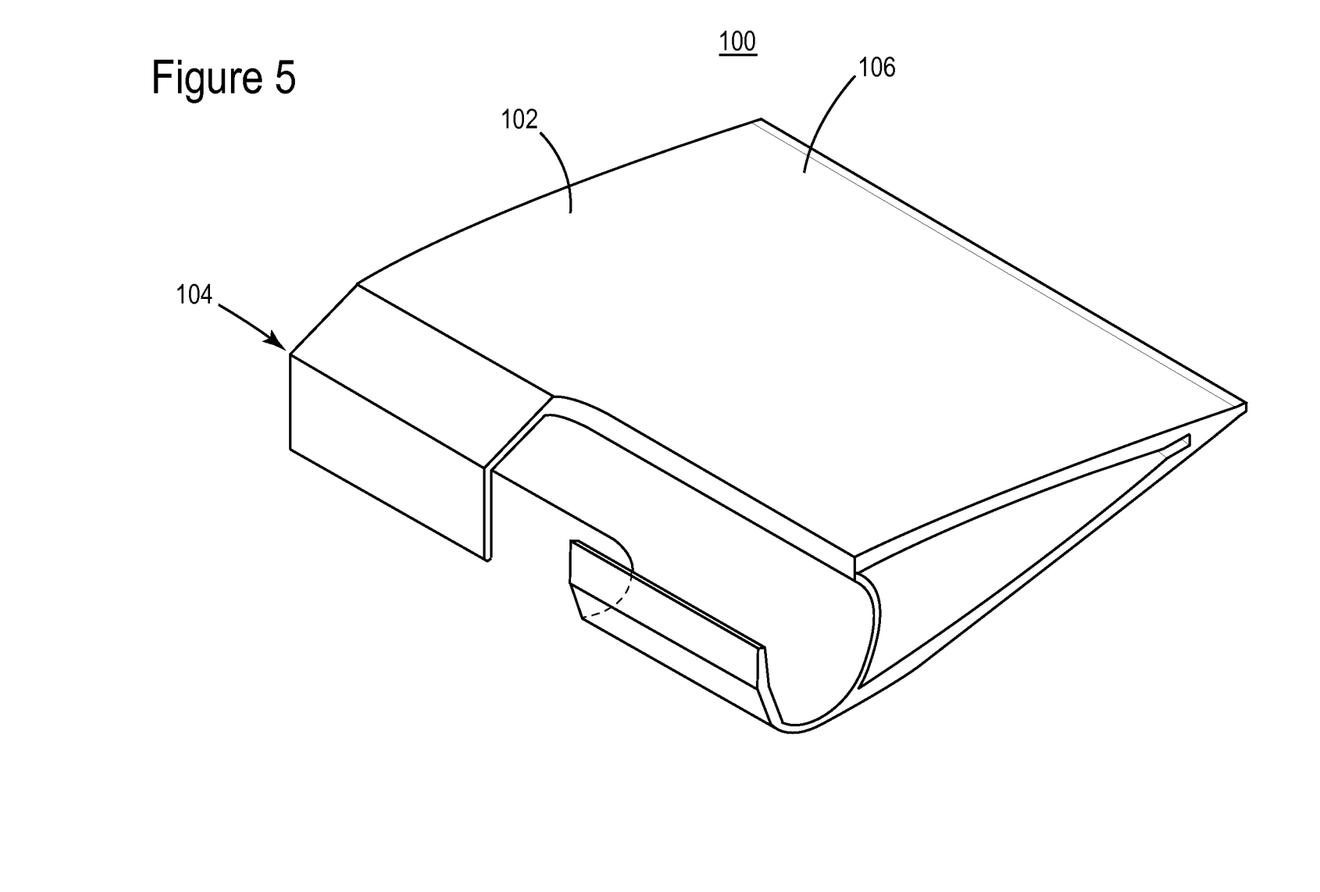
FIG. 5 is a schematic diagram of another snap-on fairing according to an exemplary embodiment.

The head portion (the leading edge) 104 has a round shape in the embodiment shown in FIG. 4. However, as shown in FIG. 5, the head portion 104 may have a sharp shape. Other shapes may be imagined by those skilled in the art. The same is true for the tail portion 106.

Figure 6:
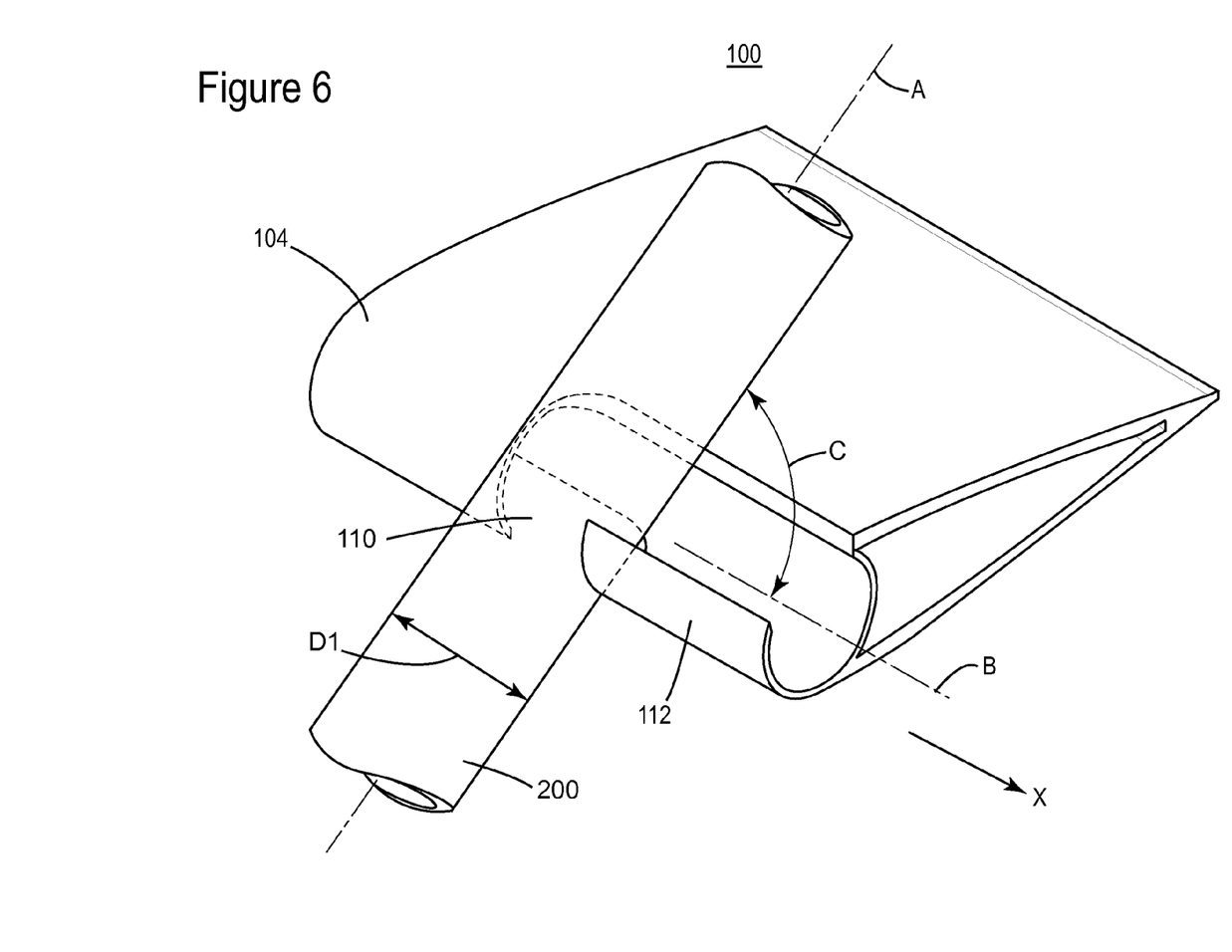
FIG. 6 is a schematic diagram illustrating how a snap-on fairing is attached to a cable according to an exemplary embodiment.

The head portion 104 has a slot 110 either at a middle point along a transversal axis X that is perpendicular to a longitudinal axis Y, or offset from the middle point. The slot 110 has a size d about the size of a diameter $D_1$ of a cable 200, as shown in FIG. 6, to which the fairing is going to be attached. The slot 110 splits the head portion 104 into two regions 112 and 114. The two regions 112 and 114 are assumed to be symmetrical for simplicity. However, the novel features discussed herein equally apply to a head portion that does not have the two regions 112 and 114 symmetrical.

Because of the assumption that the two regions 112 and 114 are symmetrical, only the structure of region 114 is discussed next because this region is better seen in FIG. 4. Region 114 may have a cylindrical shape that fits over the cable 200. The internal diameter $D_2$ of the cylindrical shape is substantially equal to the diameter $D_1$ of the cable 200 so that the fairing 100 is able to move freely around the cable 200. In one application, $D_2$ is slightly smaller than $D_1$ so that the fairing 100 still moves around the cable 200 but not as freely as in the previous case. However, according to this application, the fairing 100 is prevented from sliding along the cable.

It is noted that the region 114 is not a full cylinder, but has one part missing. The missing part, i.e., opening 120 may be half or less of the cylinder, and the purpose for this opening is, as shown in FIG. 6, to allow the cable 200 to move from a position A to a position B, i.e., to lie along the X axis. In other words, after the fairing 100 is attached to the cable 200 through the slot 110, the fairing 100 can be rotated as shown by C to snap with the entire head portion 104 around the cable 200, or the cable 200 can be rotated as also shown by C to move inside the head portion 104. In one application, the fairing 100 is manufactured to have a size $D_3$ of the opening part 120 smaller than the diameter $D_2$ so that the cable 200 needs to be squeezed to enter the cylinder region 114.

In this way, the fairing 100 may be attached or removed from the cable 200 at any desired position, almost instantaneously, as the clamp-on function can be performed by maintenance personnel in a matter of seconds.

Figure 7:
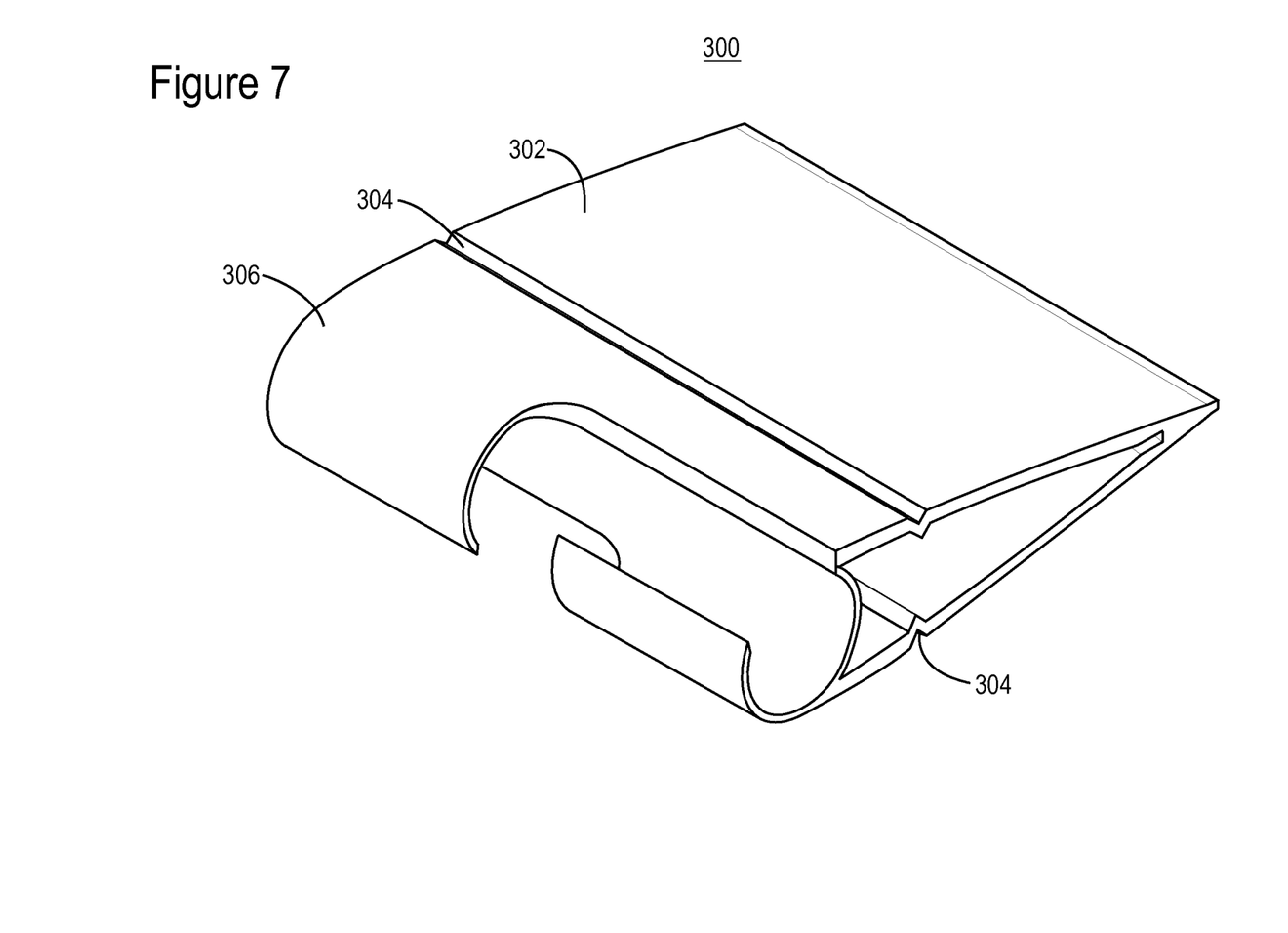
FIG. 7 is a schematic diagram of a snap-on fairing having grooves according to an exemplary embodiment.
Figure 8:
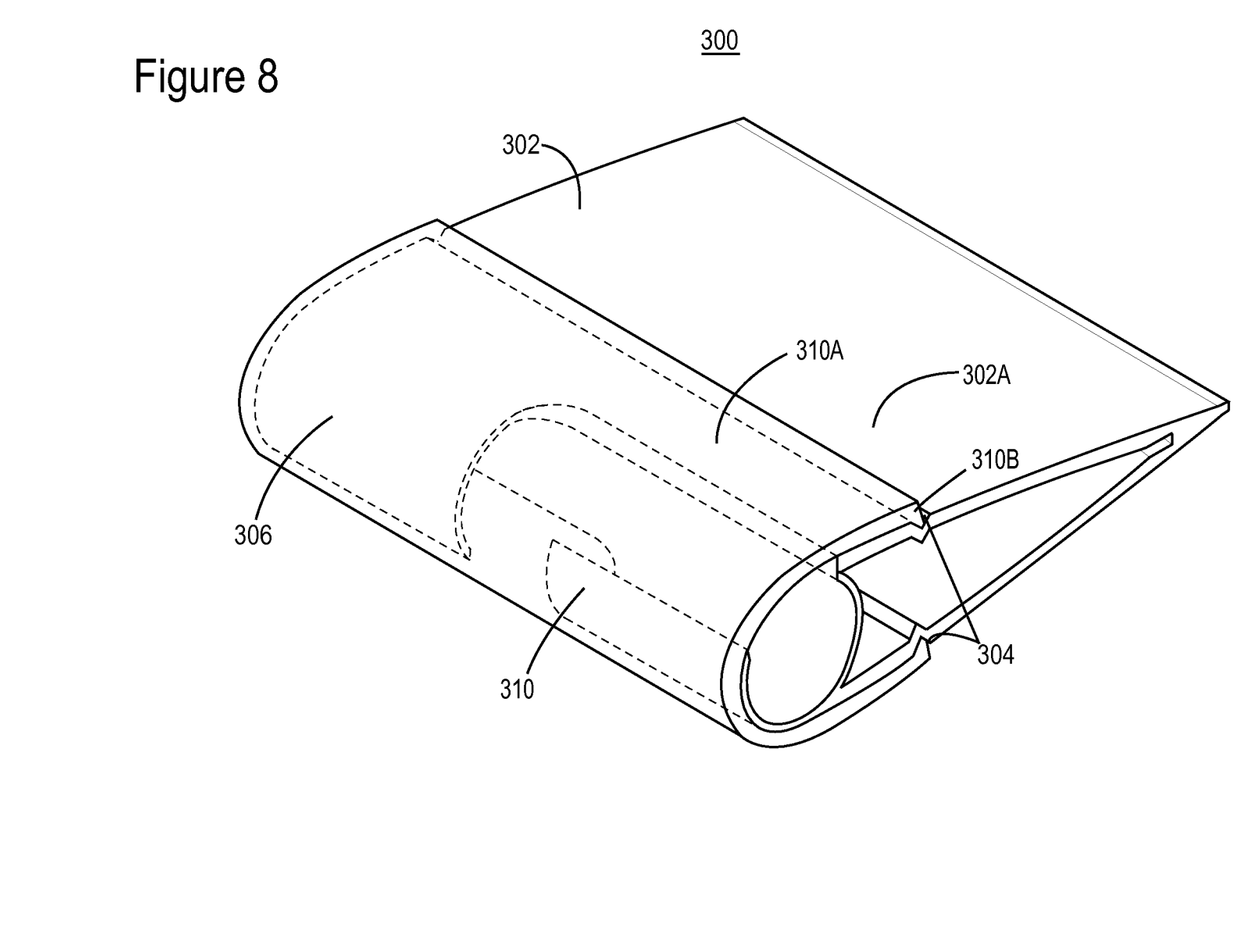
FIG. 8 is a schematic diagram of a snap-on fairing having a cover according to an exemplary embodiment.

To further reduce the drag and the noise associated with the cable, a cover may be provided over the head portion of the fairing. As illustrated in FIG. 7, a fairing 300 may have a body 302 provided with a groove 304 on each side of the body 302 and a cover 310, as shown in FIG. 8, may be attached to the fairing 300 to cover the head portion 306. The cover may be made of the same material as the fairing or of a different material. In one application, the exterior surface 310A of the cover 310 is flush with the exterior surface 302A of the body 302 for minimizing the induced noise. The cover may have a spring property (e.g., be flexible) so that it snaps into the grooves 304 and remains attached to the body 302. In one application, the cover 310 has protuberances 310B that fit into the grooves 304.

Figure 9:
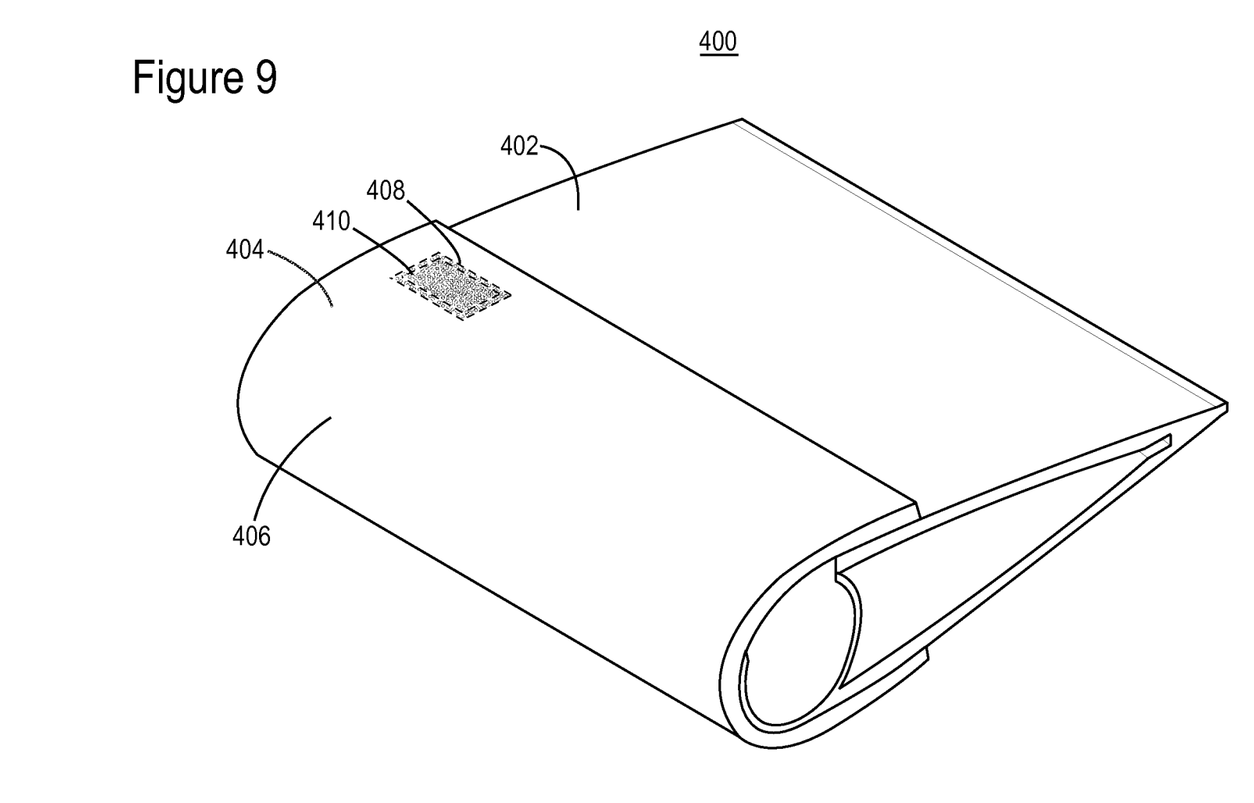
FIG. 9 is a schematic diagram of a snap-on fairing having a cover and an attaching mechanism according to an exemplary embodiment.

According to another exemplary embodiment, the cover may be made of a soft material that does not have the spring property, so that it cannot be attached to the body of the fairing by itself. In this situation, a connecting mechanism may be used to attach the cover to the body. For example, FIG. 9 shows a fairing 400 having the body 402 and the head portion 404. A cover 406, made of a soft material (e.g., fabric, plastic, etc.) may have one or more strips 408 of Velcro material, and the body 402 may have corresponding strips 410 of Velcro material. Thus, the cover 406 is attached with the strips 408 to the strips 410 of the body 402. In this case, the connecting mechanism includes the strips 408 and 410. Other connecting mechanisms may be used as would be recognized by those skilled in the art.

For the above-discussed embodiments, it is noted that the body of the fairing may be empty, as shown in FIGS. 4-9. However, in another embodiment, the body may be filled with a material having a density equal, lighter or heavier than water. Further, it is noted that there is no slot or opening in the body or the tail portion that exposes the inside of the body to the ambient, i.e., the inside of the body is sealed.

Figure 10:
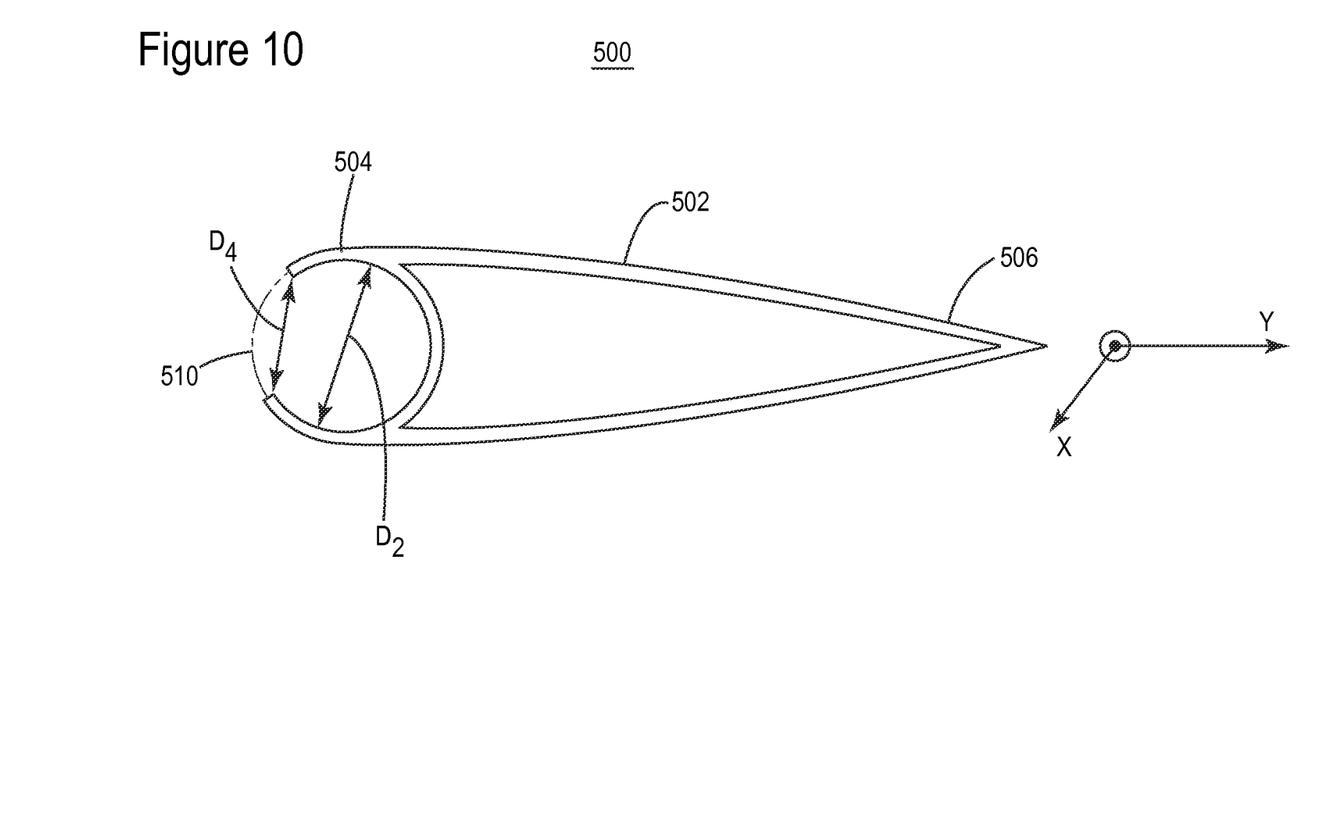
FIG. 10 is a schematic diagram of another snap-on fairing according to an exemplary embodiment.

According to another exemplary embodiment illustrated in FIG. 10, a fairing 500 has a body 502, a head portion 504 and a tail portion 506. While the body 502 and the tail portion 506 may be identical to the corresponding parts of the previous embodiments, the head portion 504 is different. The head portion 504 may have a cylindrical shape with a diameter $D_2$, similar to the embodiment of FIG. 4. However, a difference between the embodiment of FIG. 4 and the present embodiment is that there is no slot 110 to split the head portion along a transversal axis X.

Figure 11:
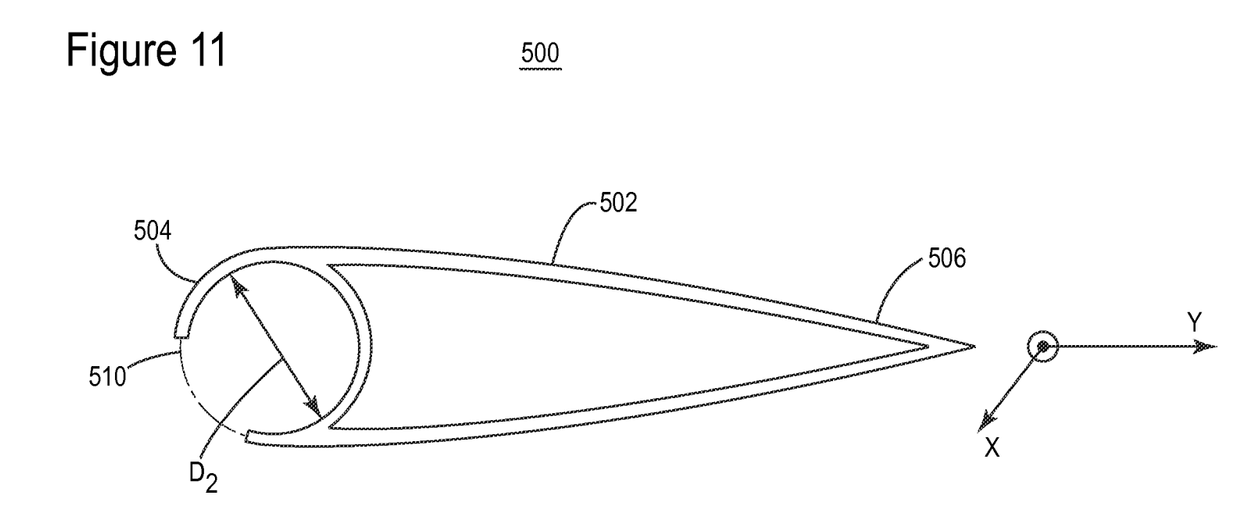
FIG. 11 is a schematic diagram of still another snap-on fairing according to an exemplary embodiment.

In fact, the present embodiment has a single slot 510 that extends along the transversal axis X of the fairing 500. The position of the slot 510 may be opposite (9 o'clock) from the tail portion 506 along a longitudinal axis Y. However, according to another exemplary embodiment illustrated in FIG. 11, the position of the slot 510 may be at any other location. A distance $D_4$ characterizing the opening of the slot 510 is smaller than $D_2$ so that the cable (not shown) needs to be squeezed inside the head portion 504. In one application, a cover as shown in FIG. 8 or 9 may be added over the head portion 504.

Figure 12:
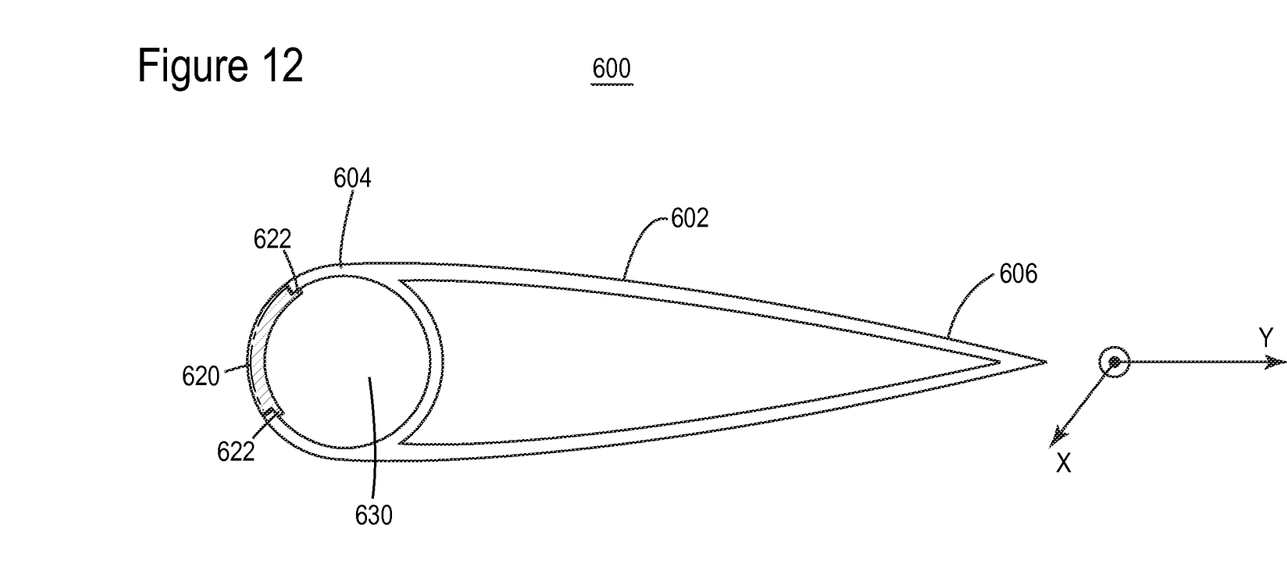
FIG. 12 is a schematic diagram of a snap-on fairing having a cover according to still another exemplary embodiment.

The embodiment illustrated in FIG. 10 may be provided with a cover, as shown in FIG. 12. The fairing 600 has the body 602, head portion 604 and tail portion 606. A slot (not shown but corresponding to slot 510 in FIG. 10) formed in the head portion 604 is covered with a cover 620. It is noted that the cover 620 may have wings 622 that enter inside a cavity 630 formed in the head portion 604. The cavity 630 is formed, as previously described, to accommodate a cable.

Figure 13:
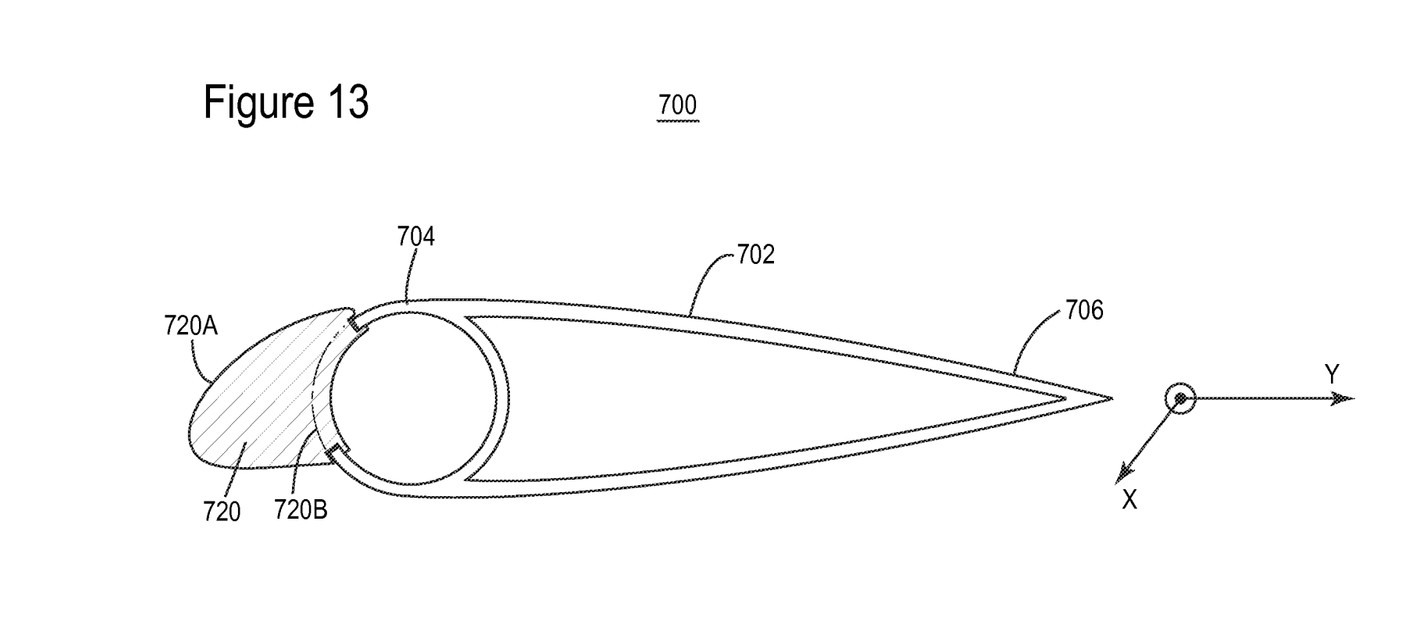
FIG. 13 is a schematic diagram of a snap-on fairing having a shaped cover according to an exemplary embodiment.

Alternatively, as shown in FIG. 13, a fairing 700 may have the elements of the fairing 600 (e.g., body 702, head portion 704, and tail portion 706) but the slot is covered with a cover 720 that has a desired shape (e.g., hydrodynamic shape). In other words, a head region 720A of the cover 720 is shaped to create a fish like shape for the entire fairing 700. Other shapes may be imagined by those skilled in the art. In addition, a peripheral region 720B may have a structure similar to the wing 622 shown in FIG. 12 or a U-shape as shown in FIG. 13 for connecting to the head portion 704.

Thus, according to one or more embodiments discussed above, a fairing can be easily attached to a cable, either in a streamer spread or a source, can be easily removed when the cables are retracted on a spool, can be easily changed when the fairing becomes damaged, or can substantially reduce the noise associated with the act of towing underwater.

Figure 14:
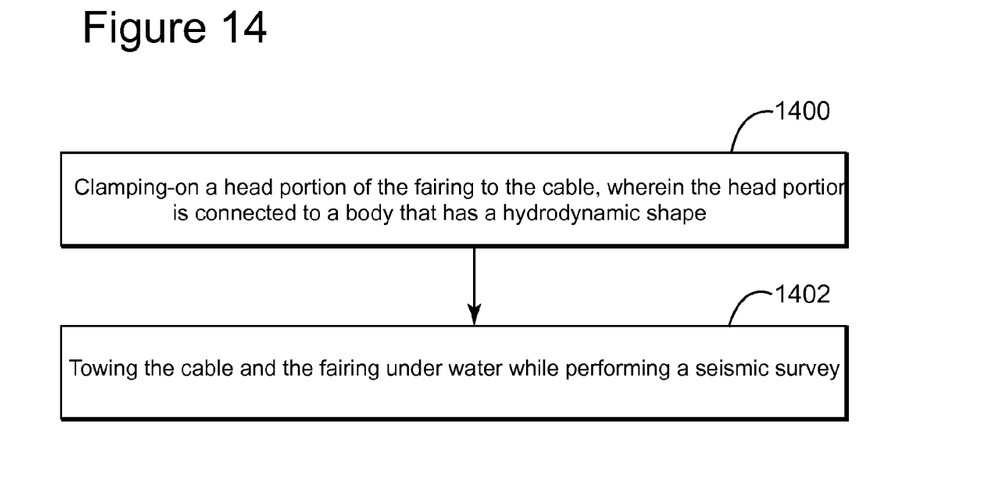
FIG. 14 is a flowchart illustrating a method for attaching or removing a fairing from a cable according to an exemplary embodiment.

According to an exemplary embodiment, a method for attaching or removing the fairing to the cable is now discussed with regard to FIG. 14. The method includes a step 1400 of clamping on the head portion of the fairing to the cable, wherein the head portion is connected to a body that has a hydrodynamic shape, and a step 1402 of towing the cable and the fairing underwater while performing a seismic survey.

The disclosed exemplary embodiments provide a system and a method for removably attaching a fairing to a cable to be towed underwater during a seismic survey. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A fairing to be attached to a cable of a seismic survey system, the fairing comprising:
    a body having a hydrodynamic shape;
    a tail portion connected to the body; and
    a head portion connected to the body, opposite to the tail portion, and configured to be removably clamped-on to the cable, the head portion having first and second regions separated by a slot and the first and second regions are configured to partially wrap around the cable,
    wherein the head portion, the body and the tail portion extend in this order along a traveling direction, and
    wherein the first and second regions have first and second openings, respectively, that expose the cable and the first and second openings extend along a length of the head portion.

2. The fairing of claim 1, wherein the first and second openings are configured to receive the cable, and the first and second openings together with the slot are configured to extend from one side of the head portion to an opposite side of the head portion along an entire length of the head portion.

3. The fairing of claim 1, wherein the first and second regions are symmetrical.

4. The fairing of claim 1, wherein the first and second regions have cylindrical shapes.

5. The fairing of claim 1, wherein an internal diameter of the first and second regions is equal to a diameter of the cable.

6. The fairing of claim 1, wherein an internal diameter of the first and second regions is less than a diameter of the cable.

7. The fairing of claim 1, further comprising:
    grooves formed in an external surface of the body.

8. The fairing of claim 7, further comprising:
    a cover configured to cover the head portion, the cover having protuberances that fit into the grooves.

9. The fairing of claim 1, further comprising:
    a cover configured to cover the head portion.

10. The fairing of claim 9, wherein an external surface of the cover is flush with an external surface of the body.

11. The fairing of claim 9, wherein the cover is made of a soft material.

12. The fairing of claim 11, further comprising:
a connecting mechanism configured to maintain the cover attached to the head portion.

13. The fairing of claim 1, wherein the head portion has a cylindrical shape with a single slot that is configured to receive the cable.

14. A fairing to be attached to a cable of a seismic survey system, the fairing comprising:
a body having a hydrodynamic shape; and
a head portion connected to the body and configured to be removable clamped-on to the cable, the head portion having first and second regions separated by a slot and the first and second regions are configured to partially wrap around the cable,
wherein the head portion and the body are towed underwater during the seismic survey, and
wherein the first and second regions have first and second openings, respectively, that expose the cable and the first and second openings extend along a length of the head portion.

15. A seismic survey system comprising:
a cable configured to be towed underwater; and
a fairing configured to be attached to the cable, wherein the fairing includes,
a body having a hydrodynamic shape,
a tail portion connected to the body, and
a head portion connected to the body, opposite to the tail portion, and configured to be removable clamped-on to the cable, the head portion having first and second regions separated by a slot and the first and second regions are configured to partially wrap around the cable,
wherein the first and second regions have first and second openings, respectively, that expose the cable and the first and second openings extend along a length of the head portion.

16. A method for attaching or removing a fairing from a cable, the method comprising:
clamping-on a head portion of the fairing to the cable, wherein the head portion is connected to a body that has a hydrodynamic shape;
towing the cable and the fairing underwater while performing a seismic survey;
inserting the cable into an opening of the fairing so that the cable is substantially perpendicular to the fairing; and
rotating the cable or the fairing by about 90° to clamp the fairing to the cable.

17. The method of claim 16, wherein the opening splits the head portion into two regions having cylindrical shapes.

18. The method of claim 16, further comprising:
attaching a cover over the head portion to reduce drag and noise.

19. The method of claim 16, further comprising:
inserting the cable into a single slot present in the head portion of the fairing.

\* \* \* \* \*